R. EHRENFELD.
CONTROL SWITCH FOR ELECTRIC MOTORS.
APPLICATION FILED OCT. 8, 1918.

1,433,707.

Patented Oct. 31, 1922.

WITNESSES:
J. P. Wurmb
F. A. Lind

INVENTOR
Ralph Ehrenfeld
BY
Wesley G. Carr
ATTORNEY

Patented Oct. 31, 1922.

1,433,707

UNITED STATES PATENT OFFICE.

RALPH EHRENFELD, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SWITCH FOR ELECTRIC MOTORS.

Application filed October 8, 1918. Serial No. 257,350.

*To all whom it may concern:*

Be it known that I, RALPH EHRENFELD, a citizen of the United States, and a resident of Wilkinsburg, in the county of Allegheny and State of Pennsylvania, have invented a new and useful Improvement in Control Switches for Electric Motors, of which the following is a specification.

My invention relates to winding mechanisms for power springs, such as are employed in phonographs, and it has particular relation to controlling devices, for the electric motors that are embodied in such mechanisms.

The object of my invention is to provide a device of the character indicated in which the switch controlling the electric motor is embodied in the motor casing, in which a minimum number of parts are required, and in which portions of the motor are utilized to improve the operation of the switch.

Heretofore, it has been customary to hold the switch in its closed position, during the period that the electric motor is winding the power spring, by means of mechanical devices, which are necessarily somewhat intricate, or by means of electromagnets, which either occupy a considerable amount of space within the motor casing or are housed within an additional structure mounted on the outside of the casing, thus adding to the cost and size of the structure, as a whole.

By my invention, I provide a device which utilizes the pole pieces of the electric motor as a magnet, thus dispensing with the added weight, cost and space resulting from the use of a separate magnet and reducing the number of parts to a minimum.

Figure 1:
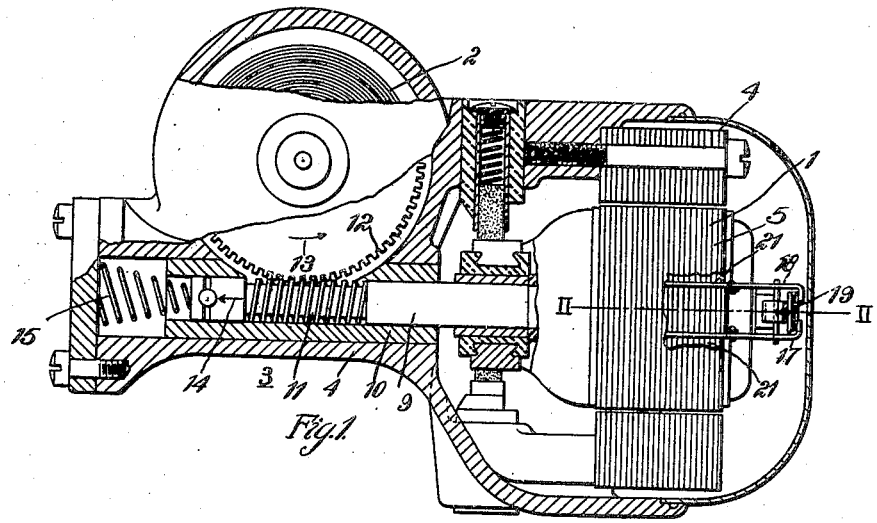
Figure 2:
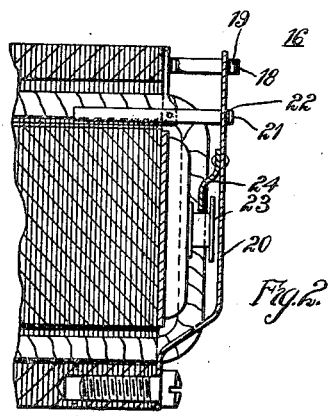
Figure 3:
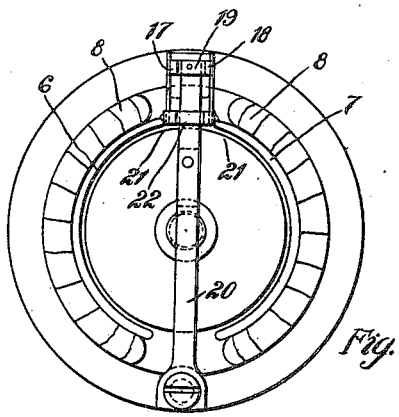
Figure 4:
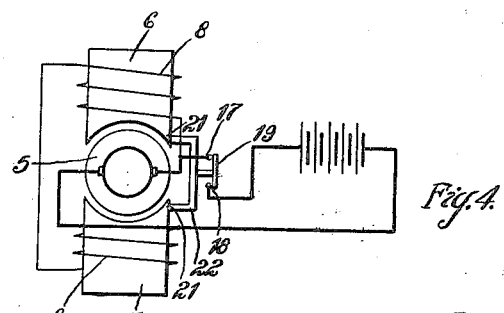

Referring to the accompanying drawings, Fig. 1 is a view, partially in section and partially in plan, of a device constructed in accordance with my invention, parts being broken away for the sake of clearness. Fig. 2 is a sectional view of a portion of the electric motor shown in Fig. 1 taken along the line II—II thereof. Fig. 3 is an end elevational view of the portion of the device shown in Fig. 2; Fig. 4 is a diagrammatic view of the circuits embodied in my invention.

Referring more particularly to the drawing, I have shown an electric motor adapted to wind a power spring 2 by means of a gearing 3. The electric motor 1 consists of a stator 4 and a rotor 5. The stator 4 comprises two field-magnet pole pieces 6 and 7 which are provided with field-magnet windings 8. The rotor 5 is mounted upon a shaft 9 which rotates and is longitudinally movable within a bearing 10 mounted within the stator member 4. The gearing 3 comprises a worm 11 mounted on the shaft 9 and adapted to cooperate with a worm wheel 12 to wind the spring 2. When the electric motor is operating, the worm wheel 12 is rotating in the direction indicated by the arrow 13, causing the torque of the spring 2 to be exerted upon the shaft 9 in the direction indicated by the arrow 14 and opposed by an axially disposed compression spring 15.

The motor 1 is controlled by means of a switch 16 comprising two stationary contact members 17 and 18 which are mounted upon the stator member 4, but insulated therefrom, and a movable bridging member 19 of conducting material mounted upon, but insulated from, a leaf spring 20 which, in turn, is mounted upon the stator member 4 at a point diametrically opposite the two contact members 17 and 18.

The field-magnet pole pieces 6 and 7 are provided with magnetizable arms 21 that are bridged by a magnetizable member 22 with which the spring member 20 is provided. The bridging members 19 and 22 are so disposed with respect to the members with which they co-operate that their engagement therewith is substantially simultaneous. The bridging members 19 and 22 are moved out of engagement with the respective stationary members by means of a disk 23 mounted upon the shaft 9 which engages a finger 24 upon the spring 20 when the shaft 9 is moved in a direction away from the switch, which occurs when the spring member 2 is completely wound.

Having described the structural features of my invention, the operation is as follows. When the spring 2 is unwound the torque exerted by it will be less than the compressive force of the spring 15, and the members of the switch 16 will be in the positions shown in Fig. 2, in which the members 17 and 18 are bridged by the member 19, thus energizing the motor 1 and causing it to wind the spring 2. When the spring 2 is wound, its torque will overcome the compressive force of the spring 15 and will cause the disk 23 to engage the finger 24, thus exerting a force upon the spring member 20, but the magnetic pull exerted upon the armature 22 by the magnetic arms 21 will resist disengagement until the torque of the motor 2 is great enough to overcome such magnetic pull and the compressive force of the spring 15. As soon as the forces just mentioned are overcome the spring 20 will cause the bridging member 19 to move instantly away from the members 17 and 18.

When the spring 2 is unwound, the compression spring 15 will exert a force greater than the torque of the spring 2 upon the shaft 9 and will force the spring 20 to move into its original position, causing the bridging members to engage the co-operating stationary members, upon which the motor again starts to wind the spring 2.

From the above description, it will be obvious to those skilled in the art that I have provided a controlling device comprising a minimum number of parts and embodying a very simple structure which is relatively inexpensive. It will also be observed that I have provided a locking device which holds the movable member of the switch firmly in position and which ensures a quick break therefor.

While I have shown one form of my invention and described in detail one application of the same, it will be obvious to those skilled in the art that it is susceptible of various minor changes and modifications without departing from the spirit thereof and I desire, therefore, that only such limitations shall be placed thereupon as are imposed by the prior art or specifically set forth in the appended claims.

I claim as my invention:

1. A winding device for a power spring comprising an electric motor provided with field-magnet pole pieces, a switch for controlling said electric motor, and means for utilizing the magnetic attraction of said pole pieces to prevent said switch from being opened until said spring has been wound to a predetermined degree.

2. The combination with a winding device for a power spring comprising an electric motor provided with field-magnet pole pieces, of a switch for controlling said electric motor comprising a circuit-interrupting element mounted on a movable arm, a portion of said arm being composed of magnetizable material and being disposed adjacent to said pole pieces.

3. A winding device for a power spring comprising an electric motor provided with field-magnet pole pieces and a rotatable and longitudinally movable armature and an electric switch for controlling said motor comprising stationary contact members mounted on said motor frame and a movable contact member adapted to bridge said stationary members to close the motor circuit, said movable contact member being mounted on a supporting member upon which is also mounted a magnetizable armature which is disposed adjacent said field-magnet pole pieces and is adapted to complete a magnetic path therebetween said supporting member being operatively connected to said rotatable armature.

4. A winding device for a power spring comprising an electric motor provided with two field-magnet pole pieces, each provided with a magnetic contact member adjacent one end thereof, and an electric switch for controlling said motor comprising stationary electrical contact members mounted on said motor frame adjacent one end thereof and an axially bendable spring member mounted on said motor frame and having mounted thereon a conducting member adapted to bridge said electrical contact members to complete the motor circuit and also a magnetizable member adapted to bridge the magnetic contact members to hold said conducting member in engagement with said electrical contact member.

5. In combination with a power spring, a winding device comprising a motor provided with field-magnet pole pieces and operatively connected to wind said spring, a switch for controlling said motor, and a quick break device for said switch embodying a portion of said field-magnet pole pieces.

6. In combination with a power spring, a winding device comprising a motor provided with field-magnet pole pieces and operatively connected to wind said spring, a switch for controlling said motor comprising a stationary and a movable contact member, and means for causing a quick break between said contact members comprising an armature magnetically attracted by said field pole pieces.

7. In combination with a power spring, a winding device therefor comprising an electrical motor provided with field-magnet pole pieces and a rotatable and axially movable armature operatively connected to wind said spring, means tending to move said armature axially in accordance with the degree to which the spring is wound, and means for opposing said movement comprising a magnetizable member attracted by said field-magnet pole pieces.

8. In combination with a power spring, a winding device therefor comprising an electrical motor provided with field-magnet pole pieces and a rotatable and axially movable armature operatively connected to wind said spring, means tending to move said armature axially in accordance with the degree to which the spring is wound, a switch for controlling said motor, comprising a movable contact member mounted upon a resilient support and an adjacently fixedly mounted co-operating contact member, said resilient support being adapted to cause said movable contact member to engage said stationary contact member upon axial movement of the armature in one direction and to be disengaged therefrom upon movement in the opposite direction, and means for preventing movement of said resilient member until said armature-displacing force has attained a certain predetermined value.

9. In combination with a power spring, a winding device therefor comprising an electrical motor provided with field-magnet pole pieces and a rotatable and axially movable armature operatively connected to wind said spring, means tending to move said armature axially in accordance with the degree to which the spring is wound, a switch for controlling said motor comprising a movable contact member mounted upon a resilient support and an adjacent fixedly mounted co-operating contact member, said resilient support being adapted to cause said movable contact member to engage said stationary contact member upon axial movement of the armature in one direction and to be disengaged therefrom upon movement in the opposite direction, and a magnetizable member mounted on said resilient support and disposed in engagement with portions of said field-magnet pole pieces when said contact members are in engagement and disposed out of engagement with said pole pieces when said contact members are disengaged.

In testimony whereof, I have hereunto subscribed my name this 30th day of Sept. 1918.

RALPH EHRENFELD.